US008719015B2

(12) United States Patent
Jang et al.

(10) Patent No.: US 8,719,015 B2
(45) Date of Patent: May 6, 2014

(54) DIALOGUE SYSTEM AND METHOD FOR RESPONDING TO MULTIMODAL INPUT USING CALCULATED SITUATION ADAPTABILITY

(75) Inventors: Jun Won Jang, Yongin-si (KR); Woo Sup Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 625 days.

(21) Appl. No.: 12/964,866

(22) Filed: Dec. 10, 2010

(65) Prior Publication Data

US 2011/0144999 A1    Jun. 16, 2011

(30) Foreign Application Priority Data

Dec. 11, 2009    (KR) .......................... 10-2009-122975

(51) Int. Cl.
*G10L 15/00* (2013.01)
*G10L 21/00* (2013.01)
*G10L 25/00* (2013.01)

(52) U.S. Cl.
USPC .................... 704/231; 704/270; 704/270.1

(58) Field of Classification Search
USPC ............................................... 704/231–257
See application file for complete search history.

(56) References Cited

U.S. PATENT DOCUMENTS

| | | | | |
|---|---|---|---|---|
| 5,479,563 | A * | 12/1995 | Yamaguchi | 704/232 |
| 6,647,363 | B2 * | 11/2003 | Claassen | 704/1 |
| 6,810,375 | B1 * | 10/2004 | Ejerhed | 704/9 |
| 6,829,603 | B1 * | 12/2004 | Chai et al. | 1/1 |
| 6,990,639 | B2 * | 1/2006 | Wilson | 715/863 |
| 7,321,854 | B2 * | 1/2008 | Sharma et al. | 704/243 |
| 7,526,465 | B1 * | 4/2009 | Forsythe et al. | 706/55 |
| 2007/0050191 | A1 * | 3/2007 | Weider et al. | 704/275 |
| 2010/0241431 | A1 * | 9/2010 | Weng et al. | 704/257 |

* cited by examiner

*Primary Examiner* — Jesse Pullias
(74) *Attorney, Agent, or Firm* — Staas & Halsey LLP (57) ABSTRACT

A dialogue system and a method for the same are disclosed. The dialogue system includes a multimodal input unit receiving speech and non-speech information of a user, a domain reasoner, which stores a plurality of pre-stored situations, each of which is formed by a combination one or more speech and non-speech information, calculating each adaptability of the pre-stored situations on the basis of a generated situation based on the speech and the non-speech information received from the multimodal input unit, and determining a current domain according to the calculated adaptability, a dialogue manager to select a response corresponding to the current domain, and a multimodal output unit to output the response. The dialogue system performs domain reasoning using a situation including information combinations reflected in the domain reasoning process, current information, and a speech recognition result, and reduces the size of a dialogue search space while increasing domain reasoning accuracy.

23 Claims, 7 Drawing Sheets

DIALOGUE SYSTEM AND METHOD FOR RESPONDING TO MULTIMODAL INPUT USING CALCULATED SITUATION ADAPTABILITY

CROSS-REFERENCE TO RELATED APPLICATIONS

This application claims the priority benefit of Korean Patent Application No. 2009-0122975, filed on Dec. 11, 2009 in the Korean Intellectual Property Office, the disclosure of which is incorporated herein by reference.

BACKGROUND

1. Field

Embodiments relate to a dialogue system to intelligently answer a question composed of natural languages of a user, to re-request a dialogue from the user, and thus increase the quality of dialogue with the user, and a dialogue method for use in the system.

2. Description of the Related Art

A dialogue system has been designed to have a conversation or dialogue with a user and carry out a command of the user, and be contained in not only a server and a terminal based on a network, but also a robot, or the like.

A dialogue system is used as an interface either to carry out a conversation with the user or to receive a user command, and may include, a keyboard and a mouse, for example. In order to use the interface, the user moves to a specific place where a keyboard and a mouse are located and manipulates the keyboard or the mouse, such that the user engages in dialogue with the dialogue system and enters a command, resulting in inconvenience of use. If the dialogue system is a robot, it is difficult for the interface to be mounted to the robot due to the mobility of the robot. Therefore, the dialogue system generally uses a speech recognition interface serving as a non-contact interface to interface with the user.

In this case, the speech recognition interface extracts characteristics of user speech, applies a pattern recognition algorithm to the extracted characteristics, allows the user to speak a certain phoneme string or a certain word string, recognizes the user's speech by back-tracking the generated phoneme string or word string, and therefore verbally informs other persons of user-desired information.

The above-mentioned speech recognition for use in the dialogue system has a low speech recognition performance in association with the speech spoken by the user, so that the dialogue system has difficulty in easily having a conversation with the user. In order to solve the above-mentioned problems, a variety of methods of enabling the dialogue system to easily have a conversation with the user have recently been proposed. A representative one of such methods is a domain-based speech recognition method.

The domain-based speech recognition scheme makes a plurality of domains of individual topics (e.g., weather, sightseeing, etc.), generates a specified language model for each domain, performs primary speech recognition of the user speech on the basis of the generated language model to recognize a keyword, performs secondary speech recognition of a domain corresponding to the recognized keyword, and recognizes the intention of the user speech, so that the domain-based speech recognition may have a natural conversation with the user.

In this case, if an unexpected error in the primary speech recognition process occurs, the domain-based speech recognition scheme carries out a secondary speech recognition process using the language model of a domain extracted by a wrongly-recognized keyword without using an additional opportunity of recovering the error, so that it unavoidably encounters the wrong recognition result, resulting in a reduction in speech recognition accuracy.

Also, if a sentence corresponding to a sentence spoken by the user includes a keyword corresponding to two or more domains, the above-mentioned recognition scheme has difficulty in identifying one from among several domains.

In this way, the domain-based speech recognition based on the Language Model (LM) determines a domain using only the speech recognition result. As a result, if a domain search space is very large and an unexpected error occurs during speech recognition, the possibility of a failure in speech recognition is very high, so that the possibility of a failure in recognizing the intention of a user is very high. Although the speech recognition is normally carried out, if the speech recognition result is commonly applied to several domains, it is difficult to determine a domain.

SUMMARY

Therefore, it is an aspect of at least one embodiment to provide a dialogue system to intelligently answer a question composed of natural language of a user, re-request a dialogue from the user, and thus increase the quality of dialogue with the user, and a dialogue method for use in the system.

Additional aspects will be set forth in part in the description which follows and, in part, will be obvious from the description, or may be learned by practice of the invention.

The foregoing and/or other aspects are achieved by providing a dialogue system includes a multimodal input unit receiving speech and non-speech information from a user, a domain reasoner, which stores a plurality of pre-stored situations, each of which is formed by a combination one or more speech and non-speech information, calculating an adaptability of each of the pre-stored situations based on a comparison with a situation generated based on the speech and the non-speech information received from the multimodal input unit, and determining a current domain according to the calculated adaptability of each of the pre-stored situations, a dialogue manager selecting a response corresponding to the current domain, and a multimodal output unit outputting the response.

The domain reasoner may generate the situation by combining speech and non-speech information received from the multimodal input unit, compare the generated situation with the pre-stored situations, and calculate the adaptability according to the result of comparison.

The domain reasoner may receive a user response corresponding to the output response so as to determine a satisfaction degree of the user, reflect the satisfaction degree in the generated situation, update the reflected result, and store the updated result.

The situations may be generated by a learning operation and stored.

Each of the situations may be configured by combining preference-, habit-, and schedule-information of the user, at least one form of non-speech information from among facial expression, dress, and gesture belonging to user status information, and speech information of the user, and may have a domain corresponding to the combination result.

The multimodal input unit may receive at least one form of non-speech information from among facial expression, dress, and gesture belonging to user status information as an input image.

The domain reasoner may select one of the pre-stored situations, wherein the selected situation has the highest adaptability.

The dialogue system may further include a domain database (DB) unit for storing a plurality of domains, wherein the domain reasoner calculates the adaptability of each domain using the selected situation, and may determine a domain having the highest adaptability to be a current domain.

The multimodal input unit may further include an environment sensing unit to detect environmental information of a room in which the user stays, and the domain reasoner may determine a domain using the environmental information.

The dialogue system may further include an information provider providing schedule information of the user, behavior history information, indoor structure information, and weather information, wherein the domain reasoner determines a domain using at least one of a schedule of the user, a behavior history, an indoor structure, and weather information.

The dialogue manager may transmit dialogue context and previous dialogue information to the domain reasoner, and the domain reasoner may determine a domain using at least one of the dialogue context and previous dialogue information.

The foregoing and/or other aspects are achieved by providing a dialogue system includes a multimodal input unit for receiving speech and non-speech information of a user, a domain reasoner, which stores a plurality of pre-stored situations, each of which is formed by a combination one or more speech and non-speech information, selecting a candidate domain corresponding to a speech signal received from the multimodal input unit, calculating an adaptability of each of the pre-stored situations based on a comparison of a situation generated based on the non-speech information received from the multimodal input unit, and determining a current domain based on one of the pre-stored situations having the highest adaptability in relation to the generated situation, and the candidate domain, a dialogue manager for selecting a response corresponding to the current domain, and a multimodal output unit for outputting the response.

Each of the situations may include a domain.

The foregoing and/or other aspects are achieved by providing a dialogue method for use in a dialogue system includes receiving speech information and non-speech information from a user, calculating an adaptability of each of pre-stored situations based on a comparison to a generated situation based on the received speech and non-speech information, determining a current domain on the basis of the calculated result, and selecting a response corresponding to the current domain and outputting the selected response.

Each of the situations may be configured by combining preference-, habit-, schedule-information of the user, at least one non-speech information from among facial expression, dress, and gesture belonging to user status information, and speech information of the user.

The received non-speech information may be at least one of facial expression, dress, and gesture belonging to user status information.

The determining of the current domain may include generating the situation by combining the received speech information and the received non-speech information, calculating adaptability by comparing the generated situation with each of the pre-stored situations, and selecting a situation having the highest adaptability.

The determining of the current domain may include receiving, if the current domain is determined, a user response corresponding to the response output, and reflecting a satisfaction degree corresponding to the user response in the generated situation, and storing the reflected result.

The determining of the current domain may include calculating the adaptability of each pre-stored domain by applying the selected situation to each of the pre-stored domains; and determining a specific domain having the highest adaptability from among the domains to be a current domain.

The determining of the specific domain having the highest adaptability to be a current domain may include comparing adaptability of the specific domain having the highest adaptability with a reference value, determining, if the adaptability is higher than the reference value, the specific domain to be a current domain, and determining, if the adaptability is equal to or lower than the reference value, occurrence of a failure in current domain reasoning, and re-requesting dialogue.

The determining of the current domain may include receiving environment information of a room in which the user is currently located, and determining a domain using the environmental information.

The determining of the current domain may include receiving schedule information of the user, behavior history information, indoor structure information, and weather information, and determining a domain using at least one of schedule information of the user, behavior history information, indoor structure information, and weather information.

The determining of the current domain may include receiving dialogue context and previous dialogue information as an input, and determining a domain using at least one of the dialogue context and the previous dialogue information.

Each of the pre-stored situations may be configured by combination of at least one form of non-speech information, select a candidate domain by recognizing the speech information, calculate adaptability of each of the pre-stored situations on the basis of the received non-speech information, select a specific situation having the highest adaptability from among the pre-stored situations, and determine a current domain on the basis of not only the domain corresponding to the selected situation but also the candidate domain.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the at least one embodiment, examples of which are illustrated in the accompanying drawings, wherein like reference numerals refer to like elements throughout.

Figure 1:
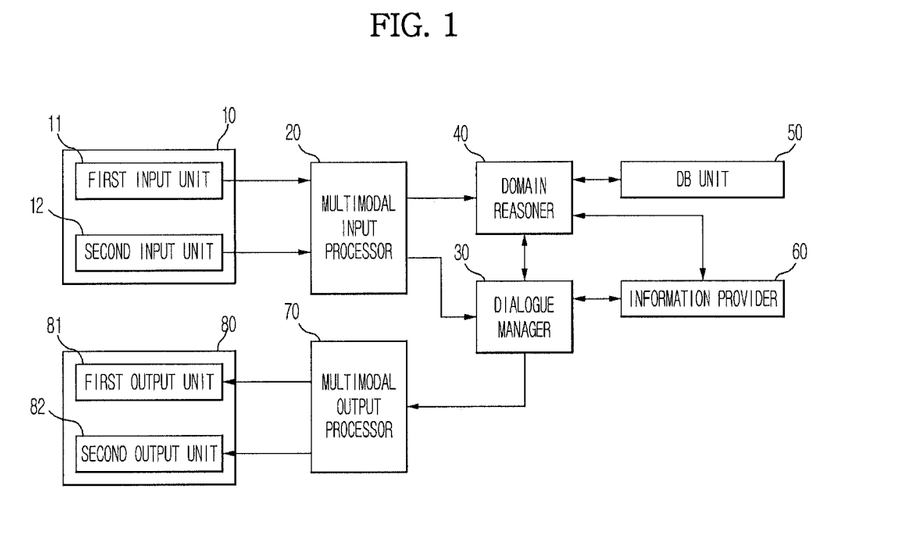
FIG. 1 is a block diagram illustrating a dialogue system according to at least one embodiment.

FIG. 1 is a block diagram illustrating a dialogue system according to at least one embodiment.

Referring to FIG. 1, the dialogue system increases the accuracy of domain reasoning so that the dialogue system can properly respond according to use intention. The dialogue system can be used in conjunction with a robot, for example, in order to determine what type of errand, for example, is to be carried out by the robot, based upon information input to the dialogue system. While the dialogue system may be used with a robot, the present at least one embodiment is not limited thereto and the dialogue system may be used in any of a variety of devices. The dialogue system includes a multimodal input unit 10, a multimodal input processor 20, a dialogue manager 30, a domain reasoner 40, a database (DB) unit 50, an information provider 60, a multimodal output processor 70, and a multimodal output unit 80.

The multimodal input unit 10 includes a first input unit 11 to receive speech information from a user and a second input unit 12 to receive non-speech information of the user, and transmits the received speech information and the non-speech information to the multimodal input processor 20.

The first input unit 11 includes a microphone, for example, or any other speech input device, and an automated speech recognizer (ASR). The microphone receives sound waves of the user speech and generates an electrical signal caused by vibration of the sound waves. The ASR converts the speech signal of the user into text data.

The ASR extracts a characteristic vector of the user speech signal, compares the extracted characteristic vector with either a language model of each word stored in a speech database (DB) or a speech model of a phoneme unit, so that the ASR extracts a candidate word or a candidate phoneme, acquires a sentence on the basis of the extracted candidate word or candidate phoneme, determines a grammar structure or a sentence context of the acquired sentence, and determines a keyword, such as the most appropriate word or phoneme, by determining whether the determined result is suitable for a specific topic, and thus determines a sentence corresponding to the determined keyword.

The second input unit 12 includes an image collection unit, such as a camera, for example, to collect user image data serving as non-speech information, and transmits the image collected by the image collector to the multimodal input processor 20.

The multimodal input unit 10 may further include an environmental sensing unit to collect environmental information, such as temperature, humidity, luminance, etc. In addition, the multimodal input unit 10 may further include a keyboard or other input device to receive letters or characters from the user.

The multimodal input processor 20 analyzes meaning information needed for dialogue management using at least one of a keyword, such as a word or phoneme, and sentence information, removes elements unnecessary for speech recognition, and fabricates the removed result.

The multimodal input processor 20 performs language processing using at least one of a keyword, such as a word or phoneme, and sentence information, and transmits the language-processed data to the dialogue manager 30 and the domain reasoner 40.

The multimodal input processor 20 includes a spoken language understanding (SLU) unit which analyzes meaning information needed for dialogue management using information of a sentence having been transmitted from the multimodal input unit 10.

The multimodal input processor 20 removes elements needed for an image transmitted from the multimodal input unit 10, fabricates the elements, and performs image processing on the fabricated result, such that the input processor 20 recognizes not only user status information that includes gesture, dress, busy or idle status, and an expression of the user, but also objects located in the vicinity of the user, and transmits the recognized image to the dialogue manager 30 and the domain reasoner 40.

The dialogue manager 30 determines dialogue context on the basis of at least one meaning of a keyword, such as a word or phoneme, and a sentence from the multimodal input processor 20, and a previous dialogue. The dialogue manager 30 stores a previous dialogue therein.

The dialogue manager 30 commands the domain reasoner 40 to determine a domain based on the dialogue context. If the domain reasoning is commanded, the dialogue manager 30 transmits dialogue context information to the domain reasoner 40.

The dialogue manager 30 generates a response corresponding to the domain determined by the domain reasoner 40. In this case, the dialogue manager 30 includes a response DB unit (not shown) that stores and manages a response message corresponding to each domain.

The domain reasoner (DR) 40 combines at least one form of non-speech information, selected from among user status information, indoor environment information, user schedule information, weather, etc., transmitted from the multimodal input processor 20 with keyword information corresponding to speech recognition, generates a situation according to the combination result, calculates the adaptability between the generated situation and each of pre-stored situations, and thus determines a domain corresponding to the user speech intention. The generated situation indicates a current condition of the device using the dialogue system, for example, the robot. The generated situation may determine which one of a plurality of errands or actions must be carried out by a device using the dialogue system, such as a robot, where examples of errands or actions are "Errand 1," "Errand 2," or "Home Management I," for example. The generated situation may determine what actions must be carried out by the device, such as the robot, on the basis of at least one of the voice information and the non-voice information.

Figure 2:
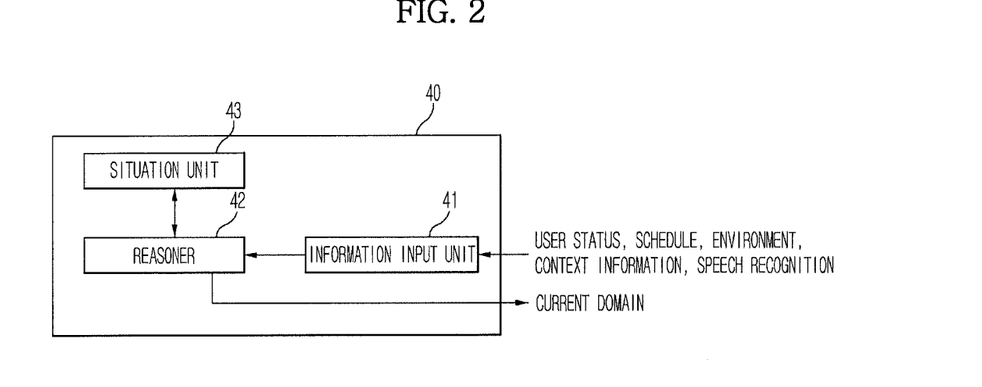
FIG. 2 is a detailed block diagram illustrating a domain reasoner contained in the dialogue system according to at least one embodiment.

In more detail, as shown in FIG. 2, the domain reasoner 40 includes an information input unit 41, a reasoner 42, and a situation unit 43.

The information input unit 41 receives user status information from the multimodal input processor 20. In this case, the user status information may include information about a gesture, an expression, and a dress of the user. In addition, the information input unit 41 receives weather information and user schedule information from the information provider 60, receives dialogue context information and previous dialogue information from the dialogue manager 30, and transmits the received information to the reasoner 42.

The reasoner 42 searches for a code that corresponds to at least one current information, e.g., speech information and non-speech information, transmitted from the multimodal input unit 10, the dialogue manager 30, and the information provider 60, in the DB unit 50, combines the searched code and thus generates a situation which indicates a current condition of the device used by the dialogue system, for example, a robot.

The reasoner 42 determines the adaptability of each of several situations pre-stored in the situation unit 43 on the basis of the generated situation information, selects the highest-adaptability situation, and determines the selected situation as a current domain. The adaptability indicates the similarity between the pre-stored situations and the generated situation.

In this case, the current information is at least two among user status information, such as a gesture, an expression, a dress, and a busy or idle status of the user, indoor environment information, such as temperature, humidity, and luminance, user schedule information, user behavior history information, weather information, dialogue context information, and previous dialogue information. The adaptability of each situation is increased in proportion to the amount of current information contained in the situation.

The reasoner 42 reflects an adaptability value of one situation having the highest adaptability situation in each of the pre-stored domains, such that the reasoner 42 calculates adaptabilities of respective domains, selects one domain having the highest adaptability, and determines the selected domain to be a final domain.

In this case, each of the situations is generated by a learning process obtained from a previous dialogue with the user, and is stored. In more detail, user satisfaction, frequency of use, and a similarity, that are based on a user response generated in the corresponding dialogue, are reflected in each of the situation.

When calculating the adaptability of each situation, the satisfaction of the user, the frequency of use, and the similarity are reflected in each situation, and therefore the adaptability of each situation is calculated on the basis of the reflected result. In this case, if at least one of the satisfaction of the user and the frequency of use is high, the adaptability is increased. If at least one of the satisfaction of the user and the frequency of use is low, the adaptability is reduced.

The calculation of adaptability of each domain may use a Baysian network or a Rule-based reasoning method.

The reasoner 42 compares the adaptability of the final domain with reference adaptability. If the adaptability of the final domain is higher than the reference adaptability, the reasoner 42 determines the success of domain reasoning, such that the reasoner 42 transmits the determined domain to the dialogue manager 30. If the adaptability of the final domain is equal to or less than the reference adaptability, the reasoner 42 determines failure of domain reasoning, such that the reasoner 42 again asks a question of the user.

Figure 3:
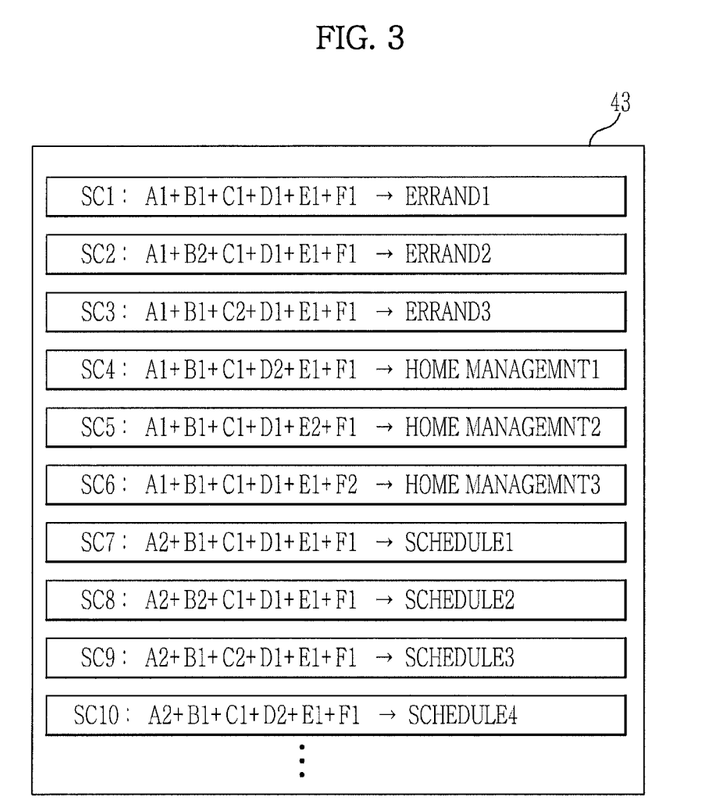
FIG. 3 is a detailed structural diagram illustrating a situation unit of a domain reasoner contained in the dialogue system according to at least one embodiment.

The situation unit 43 includes a combination of information, i.e., user preferences and habit, used in domain reasoning, speech information, and at least one form of non-speech information from among user status information, such as gesture, facial expression, dress, schedule of the user, environment information, and weather information. Referring to FIG. 3, the situation unit 43 includes a plurality of situations, i.e., a first situation SC1, a second situation SC2, . . . a ninth situation SC9, a tenth situation SC10, etc. In this case, the situations are generated by a learning process through a previous dialogue with the user, and are stored.

In this case, the user preferences and habit are determined depending on a response corresponding to user status information. For example, preference information about whether the user prefers to send a person on an errand while exercising, preference information about whether the user prefers to send a person on an errand while watching a TV, and preference information about whether the user manages his or her schedule can be recognized by the learning process.

If domain reasoning is completed, the situation unit 43 stores a situation having a variety of information reflected in the domain reasoning. If there is a situation having all information, the situation unit 43 updates the adaptability of a corresponding situation.

The adaptability of each situation is compared with predetermined removal reference adaptability, such that the situation unit 43 removes a situation having a low adaptability of less than the removal adaptability.

A domain DB unit 45 (see FIG. 8) stores domains of respective topics therein. The domain DB unit 45 stores a language model for each domain pre-obtained by a learning process of each domain.

When performing the domain reasoning, the domain reasoner 40 uses not only several situations that have been generated and stored through prior learning, but also current information, such that the domain reasoner 40 can reduce a dialogue search space and increase the accuracy of domain reasoning.

Figure 4:
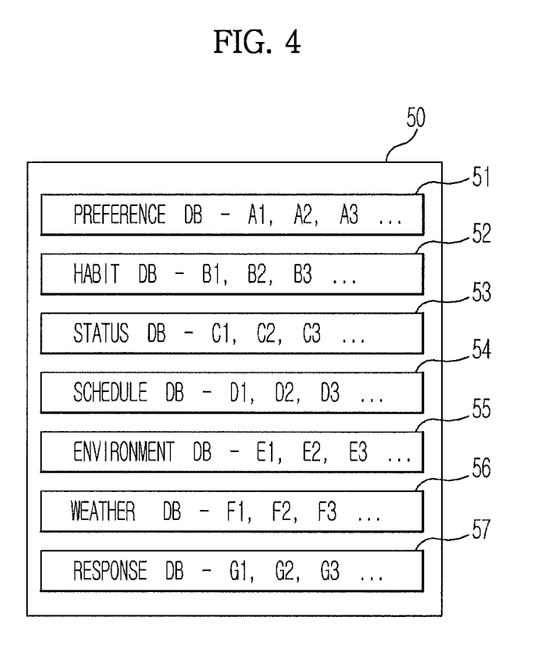
FIG. 4 is a detailed structural diagram illustrating a database (DB) unit contained in the dialogue system according to at least one embodiment.

Referring to FIG. 4, the DB unit 50 includes a preference DB 51, a habit DB 52, a status DB 53, a schedule DB 54, an environment DB 55, a weather DB 56, and a response DB 57. The preference DB 51 stores codes (A1, A2, A3 . . . ) corresponding to information of user preferences. The habit DB 52 stores codes (B1, B2, B3 . . . ) corresponding to user habit information. The status DB 53 stores codes (C1, C2, C3 . . . ) corresponding to dress information, facial expression information, and gesture information of the user. The schedule DB 54 stores codes (D1, D2, D3 . . . ) corresponding to the user schedule information. The environment DB 5 stores codes (E1, E2, E3 . . . ) corresponding to environment information, such as room temperature and room humidity. The weather DB 56 stores codes (F1, F2, F3 . . . ) corresponding to weather information. The response DB 57 stores codes (G1, G2, G3 . . . ) corresponding to user responses. If a request of the domain reasoner 40 is received in the DB unit 50, the DB unit 50 searches for a code corresponding to the received request, and transmits the searched code to the domain reasoner 40.

The information provider 60 collects a variety of information over a local area network (LAN) and a remote network (RN), and transmits the collected information to the dialogue manager 30 and the domain reasoner 40. In other words, the information provider 60 receives user behavior history information, indoor structure information, and user information from a terminal (not shown) over the LAN, and transmits the received information to the dialogue manager 30 and the domain reasoner 40. The information provider 60 gains access to a website over a remote network (RN), receives user schedule information and weather information, etc., and transmits the received information to the dialogue manager 30 and the domain reasoner 40. In this case, the user schedule information may indicate specific information that is recorded in a corresponding website by the user who has gained access to the corresponding website.

The multimodal output processor 70 generates sentence data or behavior indication data of a text corresponding to a response transmitted from the dialogue manager 30, and transmits the sentence data or the behavior indication data to the multimodal output unit 80.

The multimodal output unit 80 may output speech corresponding to the sentence of the text transmitted from the multimodal output processor 70, or may also conduct behavior corresponding to the sentence of the text. In other words, the multimodal output unit 80 includes a Text To Speech (TTS) system to convert text corresponding to a response to speech, a first output unit 81 to amplify the converted speech to an appropriate level and output the amplified result as speech, and a second output unit 82 to conduct behavior corresponding to the response.

The second output unit 82 may display a letter or emoticon, for example, corresponding to the response on a display.

In this case, the second output unit 82 may be implemented as a display device capable of displaying the response as one or more letters. In this case, the display device may be implemented as a touch-screen on which dialogue with the user, a command input operation, and a response display operation can all be made available.

If the dialogue system is provided in a robot, the second output unit 82 drives respective joints of the robot so as to perform behavior corresponding to a response.

Figure 5:
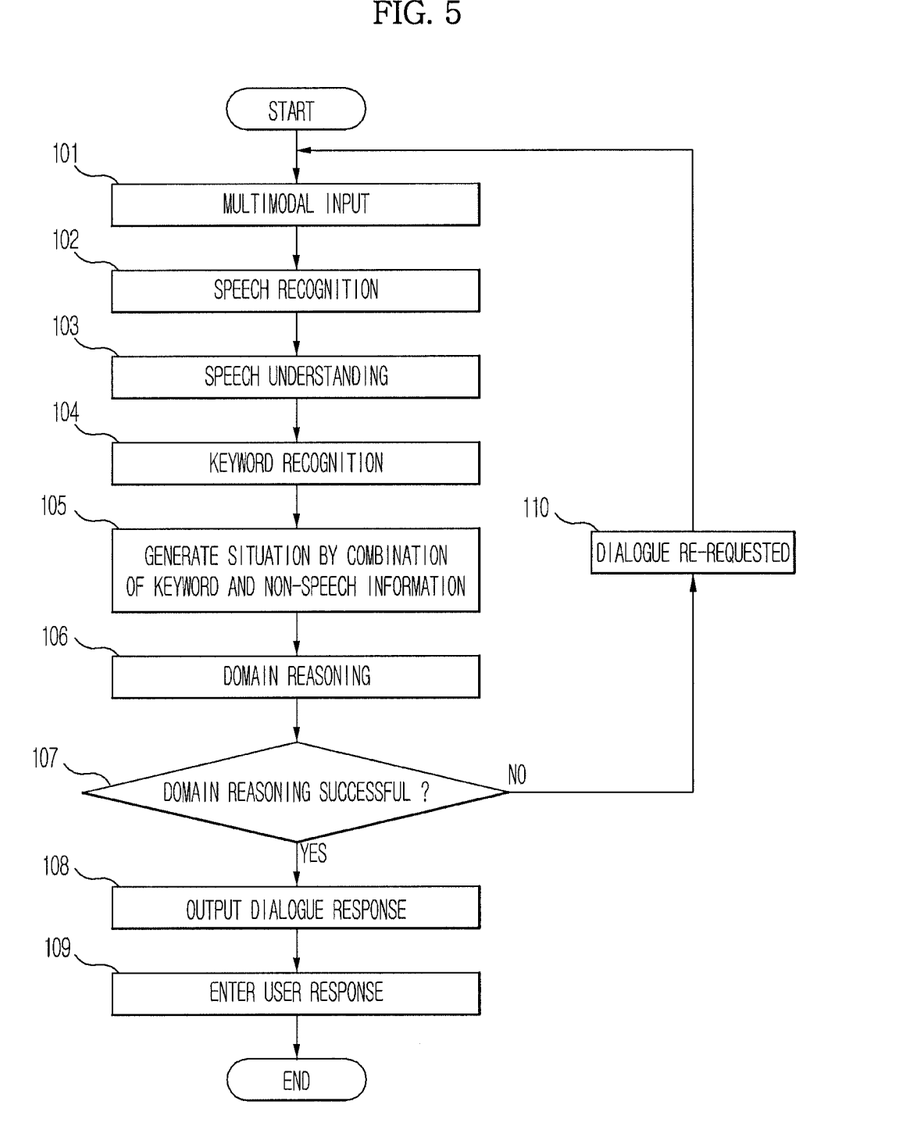
FIG. 5 is a flowchart illustrating a dialogue method for use in the dialogue system according to at least one embodiment.

FIG. 5 is a flowchart illustrating a dialogue method for use in the dialogue system according to at least one embodiment.

The dialogue method shown in FIG. 5 will hereinafter be described with reference to FIGS. 1 to 4.

Multimodal information is received at operation 101. The multimodal information may include speech information spoken by a user, user image information serving as non-speech information, and indoor environment information.

At operation 102, the dialogue method extracts a characteristic vector of user speech, compares the extracted characteristic vector with either a language model of each word stored in a speech DB or a speech model of a phoneme unit, so that the speech DB or speech model extracts a candidate word or a candidate phoneme, acquires a sentence on the basis of the candidate word or candidate phoneme, determines grammar structure or sentence context of the acquired sentence, determines a keyword, such as the most appropriate word or phoneme, determines a sentence corresponding to the keyword, and thus performs speech recognition.

At operation 103, the dialogue method performs speech recognition that analyzes meaning information needed for dialogue management using at least one of a word, a phoneme, and sentence information, performs language processing, and determines dialogue context on the basis of, not only meaning information of sentence, word, and phoneme, but also previous dialogue.

At operation 104, the dialogue method receives a plurality of sentences, words, and phonemes corresponding to the next speech recognition result, calculates reliability on the basis of the received information, and recognizes a keyword from among some words each having a greater reliability than a reference reliability.

The dialogue method performs image processing, recognizes gesture, dress, and facial expression information, which are used as user status information, and recognizes an object located in the vicinity of a user. In this case, the dialogue method can recognize user preferences or habits on the basis of the user status information.

The dialogue method receives user behavior history information, indoor structure information, and personal user information from a terminal (not shown) over the LAN, gains access to a website over a remote network (RN), and receives user schedule information and weather information, etc. In this case, the user schedule information may indicate specific information that is recorded in a corresponding website by the user who has gained access to the corresponding website.

At operation 105, upon receiving at least one current information, i.e., upon receiving at least one form of non-speech information from among a gesture, a facial expression, dress information (belonging to user status information), user preferences, habits, indoor environment information, user behavior history information, and weather information, the dialogue method combines at least one form of non-speech information with a keyword acting as speech information, and generates a situation. In this case, current information, dialogue context information, and previous dialogue information may be further reflected at operation 105.

The adaptability between the generated situation and each pre-stored situation is calculated to determine a current domain at operation 106. The success or failure of the current domain reasoning is determined at operation 107. If the success of the current domain reasoning is determined at operation 107, the dialogue method generates a response corresponding to the current domain, converts sentence data of a text corresponding to the generated response into a speech signal, amplifies the speech signal to an appropriate level, and outputs the resultant speech at operation 108. The dialogue method conducts a behavior corresponding to the generated response, and receives a user response at operation 109. In addition, if the dialogue system is provided in the robot, the dialogue method drives respective joints of the robot so as to perform behavior corresponding to the response.

In contrast, if the current domain reasoning has failed at operation 107, the dialogue method again asks for dialogue of the user at operation 110.

Figure 6:
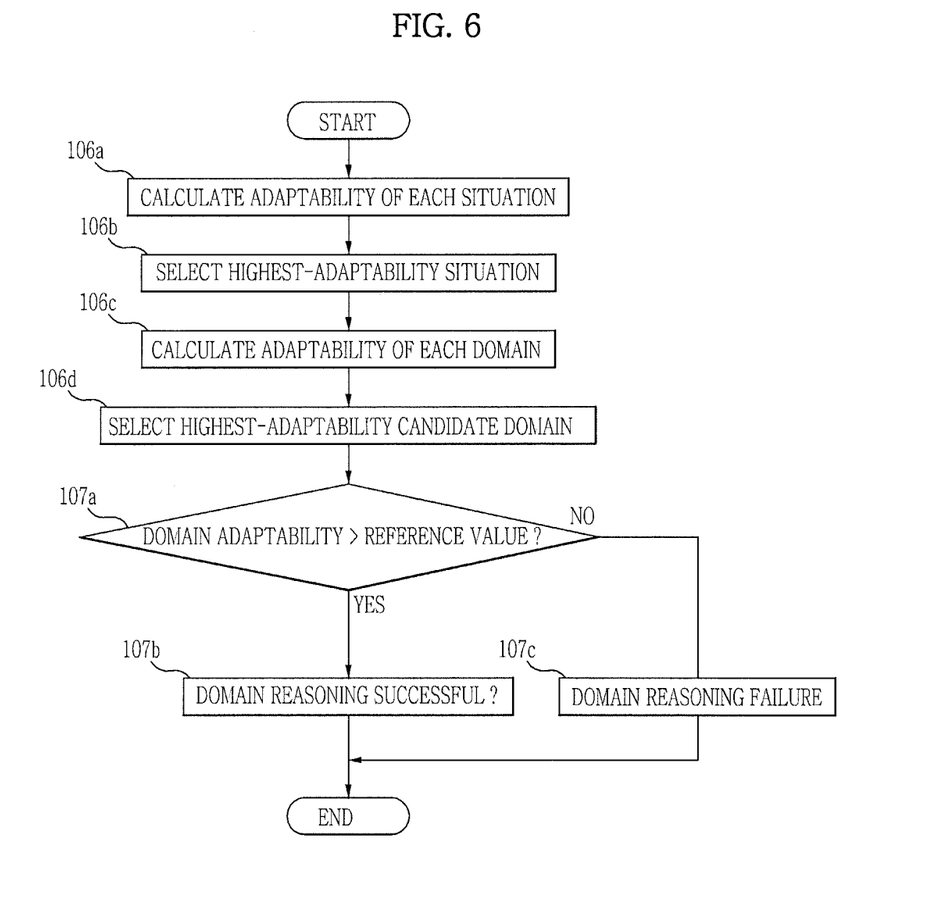
FIG. 6 is a flowchart illustrating a domain reasoning method for use in the dialogue method of the dialogue system according to at least one embodiment.

The domain reasoning operation 106 will hereinafter be described with reference to FIG. 6. The adaptability between the generated situation and each pre-stored situation is calculated at operation 106a.

In this case, the calculating the adaptability of each situation is achieved by calculation of the coincidence degree acquired by comparing combination information of the generated situation with that of the pre-stored situation.

In addition, the similarity of information may also be reflected in the calculating of the adaptability of each situation by comparing combination information of the generated situation with that of the pre-stored situation.

In this case, user satisfaction, frequency of use, and similarity caused by a user response generated during dialogue are reflected in the calculating of the adaptability of each of the situations.

In other words, the adaptability of each situation is increased when at least one of the user satisfaction and the frequency of use is high. Otherwise, if at least one of the user satisfaction and the frequency of use is low, the adaptability of each situation is decreased.

Next, the highest-adaptability situation is selected at operation 106b. The adaptability of the highest-adaptability situation is reflected and the adaptability of each domain is calculated at operation 106c. One domain having the highest adaptability is selected at operation 106d, such that the selected domain is determined to be a final domain.

In this case, the calculation of the adaptability of each domain may be achieved by a Baysian Network, or may also be achieved by the Rule-based reasoning scheme.

Figure 7:
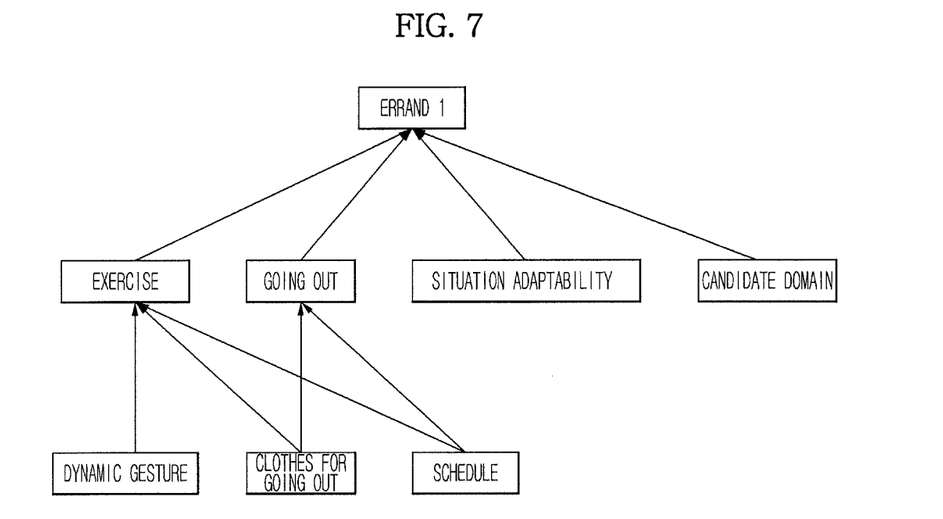
FIG. 7 is a conceptual diagram illustrating an example of the domain reasoning method for use in the dialogue method of the dialogue system according to at least one embodiment.

Referring to FIG. 7, the calculation of the adaptability of each domain will hereinafter be described with reference to a Baysian Network. In order to recognize the probability of one case in which a user-intended domain is a domain denoted by 'Errand 1', a candidate domain based on exercise, going-out, situation adaptability, and speech recognition is used as an evidence value. In this case, a variety of evidence values may be used to recognize the presence or absence of exercise, for example, information indicating whether a user's gesture is a dynamic motion, information indicating whether a user wears clothes for going out, and user schedule information. A variety of evidence values may be used to recognize the presence or absence of a user's going-out, for example, information indicating whether a user wears clothes for going out and user schedule information.

As described above, a similar Baysian network for each of a schedule management domain and a home management domain is configured. One domain having the highest probability from among respective models is determined to be a current domain.

Next, it is determined whether the domain reasoning has been successful at operation 107. In more detail, the adaptability of the final domain is compared with a reference value at operation 107a. If the adaptability of the final domain is higher than the reference value, the success of domain reasoning is determined at operation 107b, and a response to a dialogue is output at operation 108 (see FIG. 5).

Thereafter, the dialogue system receives a response from the user at operation 109, and reflects a user satisfaction corresponding to the received response in a corresponding situation.

That is, even though the domain reasoning has succeeded, this reasoning may be wrong, so that the dialogue system receives the user response and re-confirms the success or failure of domain reasoning. In this case, the success or failure of the final domain is determined by a user response.

A situation having all information having been reflected in the reasoning of the current domain is stored. In this case, the satisfaction degree based on the user response is reflected and stored.

In contrast, if the adaptability of the final domain is equal to or less than the reference value, it is determined whether the domain reasoning has failed at operation 107c, and dialogue with the user is again requested at operation 110.

In the case where the domain reasoning has failed, the dialogue with the user is again requested, and a speech signal generated by a user who answers the dialogue re-requesting action is recognized, the domain reasoning is again performed using the recognized speech information and current non-speech information. In this case, if the domain reasoning is successful, dialogue response is generated and output, and the dialogue system waits for a user response.

The adaptability of each situation is compared with predetermined removal adaptability, so that a situation having a specific adaptability of less than the removal adaptability is removed. In this case, a plurality of situations is derived from the learning of the highest-probability case.

A situation composed of several information combinations reflected in the domain reasoning, current information, and the speech recognition result are applied to the domain reasoning process, such that the size of the dialogue search space can be reduced, and the accuracy of domain reasoning can be increased. As a result, an appropriate response can be made so that natural dialogue with the user can be achieved.

The accuracy of domain reasoning is increased so that the intention of the user who has generated the dialogue can be more accurately recognized. In addition, the service appropriate for the user's dialogue intention can be carried out so that the satisfaction degree of the user who uses the service is increased.

Indoor environment information, user schedule information, user behavior information, and structure information of a user's home are provided over a network. The above-mentioned information is reflected in the domain reasoning process, so that a response appropriate for the user's dialogue intention depending on a current environment condition can be carried out.

Figure 8:
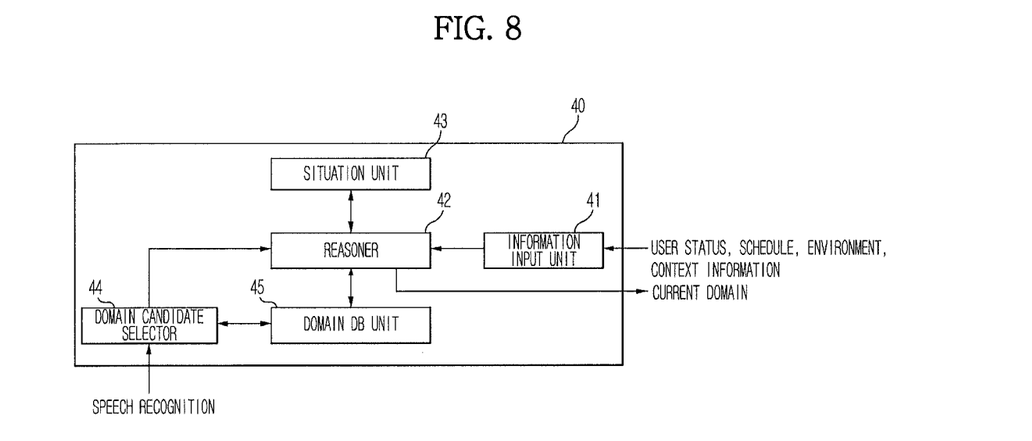
FIG. 8 is a detailed block diagram illustrating a domain reasoner contained in the dialogue system according to at least one embodiment.

FIG. 8 is a detailed block diagram illustrating a domain reasoner contained in the dialogue system according to at least one embodiment.

Referring to FIG. 8, a domain corresponding to the speech recognition is determined so that a candidate domain is selected. Environment information (user status, room temperature, humidity, luminance, etc.), current information (user schedule, weather, etc.), the speech recognition result, and a situation's adaptability are reflected in the process of deciding a domain corresponding to the user's dialogue intention.

In more detail, as can be seen from FIG. 8, the domain reasoner 40 includes an information input unit 41, a reasoner 42, a situation unit 43, a domain candidate selector 44, and a domain DB unit 45.

The information input unit 41 receives gesture-, dress-, and facial expression-information of the user from the multimodal input processor 20, receives weather information and schedule information from the information provider 60, receives dialogue context information and previous dialogue information from the dialogue manager 30, and transmits the received information to the reasoner 42.

The reasoner 42 searches for a code corresponding to a plurality of current information that has been transmitted from the multimodal input unit 10, the dialogue manager 30, and the information provider 60, in the DB unit 50. The reasoner 42 searches for a situation having the searched code. In this case, domain reasoning is carried out on the basis of a domain of the searched situation and a candidate domain.

In this case, the current information is at least one form of non-speech information from among gesture information, facial expression information, dress information of the user, indoor environment information, user schedule information, user behavior history information, weather information, dialogue context information, and previous dialogue information.

A detailed description of the domain reasoning is as follows. The reasoner 42 calculates the adaptability of each of the situations on the basis of the received non-speech information, selects one situation having the highest adaptability, and calculates the adaptability of each candidate domain by reflecting the adaptability of the selected situation, selects one domain having the highest adaptability, and determines the selected domain to be a final domain.

In this case, the calculating of the adaptability of each situation is achieved by calculation of the coincidence degree acquired by comparison between current input non-speech information and non-speech information of several situations. In addition, user satisfaction, frequency of use, and similarity, that are based on a user response generated in the corresponding dialogue, are reflected in each of the situations.

The calculation of adaptability of each domain may use a Baysian network or a Rule-based reasoning method.

The reasoner 42 compares the adaptability of the final domain with reference adaptability. If the adaptability of the final domain is higher than the reference adaptability, the reasoner 42 determines the success of domain reasoning, such that the reasoner 42 transmits the determined domain to the dialogue manager 30. If the adaptability of the final domain is equal to or less than the reference adaptability, the reasoner 42 determines the failure of domain reasoning, such that the reasoner 42 again asks a question of the user.

The situation unit 43 includes a combination of information (i.e., user preferences and habits) used for domain reasoning, speech information, and at least one form of non-speech information from among user status information, (such as gesture, facial expression, dress, schedule of the user), environment information, and weather information.

In this case, the user preferences and habits are determined depending on a response corresponding to user status information. For example, preference information about whether the user prefers to send a person on an errand while exercising, preference information about whether the user prefers to send a person on an errand while watching a TV, and preference information about whether the user manages his or her schedule can be recognized by the learning process.

The situation unit 43 may store a situation having a variety of information reflected in the domain reasoning. If there is a situation having all of information, the situation unit 43 updates the adaptability of a corresponding situation.

The situation unit 43 compares the adaptability of each situation with predetermined removal adaptability, such that the situation unit 43 removes a situation having an adaptability less than the removal adaptability.

The domain candidate selector 44 receives a plurality of sentences, words, and phonemes corresponding to the speech recognition result acquired from the multimodal input unit 10, calculates reliability on the basis of the received information, and selects a keyword from among some words each having a greater reliability than a reference reliability. The domain candidate selector 44 extracts candidate domains on the basis of the selected keyword, and selects one domain having a higher score than a reference score from among extracted candidate domains as a candidate domain. The domain candidate selector 44 selects a predetermined number of candidate domains on the basis of a language model stored in the domain DB unit 45.

The domain DB unit 45 stores domains corresponding to respective topics therein. The domain DB unit 45 stores pre-calculated language models of respective domains acquired by the learning of each domain.

Figure 9:
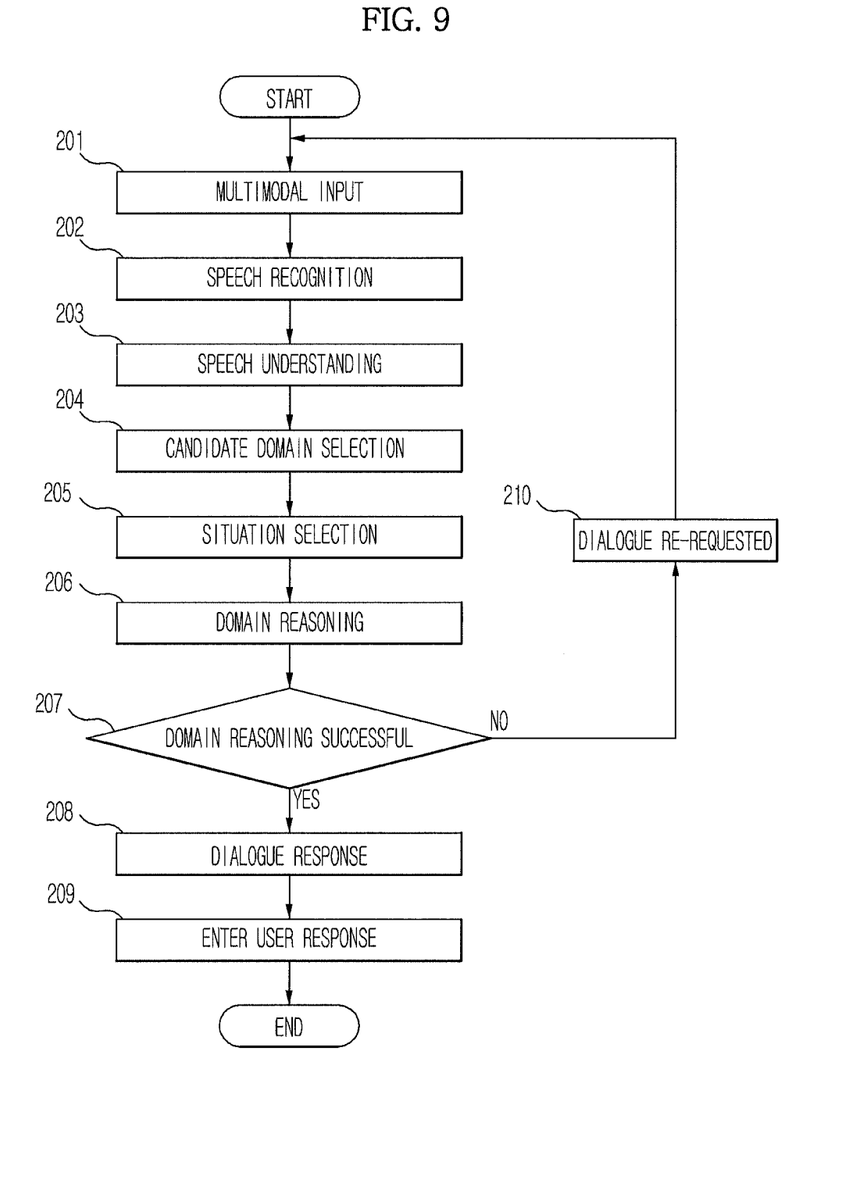
FIG. 9 is a flowchart illustrating a domain reasoning method for use in the dialogue method of the dialogue system according to at least one embodiment.

FIG. 9 is a flowchart illustrating a domain reasoning method for use in the dialogue method of the dialogue system according to at least one embodiment. A detailed description of the flowchart shown in FIG. 9 will also be described with reference to FIG. 8.

Speech information caused by a user dialogue and multimodal information acting as non-speech information, e.g., user's image information and indoor environment information, etc., is input to the dialogue system at operation 201.

The dialogue system extracts a characteristic vector of the user's speech signal, compares the extracted characteristic vector with either a language model of each word stored in the speech database (DB) or a speech model of a phoneme unit, so that the system extracts a candidate word or a candidate phoneme, acquires a sentence on the basis of a candidate word or a candidate phoneme, determines grammar structure or sentence context of the acquired sentence to determine the most appropriate word or phoneme, determines a sentence corresponding to the determined result, and thus performs speech recognition at operation 202.

The dialogue system performs the speech understanding process at operation 203. At operation 203, the dialogue system analyzes meaning information needed for dialogue management using at least one of word, phoneme, and sentence information, performs language processing, and determines dialogue context using at least one meaning from among a sentence, a word, and a phoneme, and a previous dialogue.

Next, the dialogue system receives a plurality of sentences, words, and phonemes corresponding to the speech recognition result, calculates a reliability on the basis of the received information, and selects a keyword from among some words each having a greater reliability than a reference reliability.

The dialogue system extracts at least one candidate domain on the basis of the selected keyword, and selects one domain having a score higher than a reference score from among extracted candidate domains as a candidate domain. In the above-mentioned operation 204 of selecting the candidate domain, at least one candidate domain is selected on the basis of language models of individual domains stored in the domain DB unit 45.

Next, the dialogue system performs the next image processing, recognizes gesture, dress, and facial expression information that are used as user status information, and recognizes an object located in the vicinity of a user. In this case, the dialogue system can recognize user preferences or habits on the basis of the user status information.

The dialogue system receives user behavior history information, indoor structure information, and personal user information from a terminal (not shown) over the LAN, gains access to a website over a remote network (RN), and receives user schedule information and weather information, etc. In this case, the user schedule information may indicate specific information that is recorded in a corresponding website by the user who has gained access to the corresponding website.

In addition, the dialogue system calculates the adaptability of each situation on the basis of the received non-speech information, and selects one situation having the highest adaptability at operation 205. In this case, a domain corresponding to the combined information is established in each situation. In this case, current information, dialogue context information, and previous dialogue information may be further reflected in operation 205.

Next, the adaptability of the next-selected situation is reflected in the operation of calculating the adaptability of each candidate domain, one domain having the highest adaptability is selected, and the selected domain is determined to be a final domain at operation 206. In this case, the calculation of the adaptability of each domain may use a Baysian network or a Rule-based reasoning method.

Thereafter, the dialogue system determines the success or failure of the domain reasoning at operation 207. That is, the adaptability of the final domain is compared with the reference adaptability. If the adaptability of the final domain is higher than the reference adaptability, the success of domain reasoning is determined so that a dialogue response is carried out at operation 208. Then, the dialogue system receives a user response at operation 209, and reflects user satisfaction corresponding to the received response in a corresponding situation.

In the operation 208 of executing such dialogue response, a response corresponding to the decided domain is generated, and sentence data or behavior indication data of text corresponding to the generated response is generated. In this case, the dialogue system converts text corresponding to the generated response into a speech signal, amplifies the speech signal to reach an appropriate level, and outputs the resultant speech. The dialogue system performs a behavior corresponding to the generated response. In addition, if the dialogue system is provided in the robot, the system drives respective joints of the robot so as to perform behavior corresponding to the response.

Even though the domain reasoning has succeeded, this reasoning may be wrong, so that the dialogue system receives the user response and re-confirms the success or failure of domain reasoning. In this case, the user's response is reflected in a situation that has been generated by a combination of information units during the current domain reasoning, and then stored in the situation.

In contrast, if the adaptability of the final domain is equal to or less than the reference adaptability, the dialogue system determines the failure of domain reasoning, such that the dialogue system again asks a question of the user at operation 210.

If the domain reasoning has failed, the dialogue with the user is again requested. If a speech signal generated by a user who answers the dialogue re-requesting action is recognized, the domain reasoning is again performed using the recognized speech information and current non-speech information. In this case, if the domain reasoning is successful, a dialogue response is generated and output, and the dialogue system waits for a user response.

As is apparent from the above description, since the dialogue system according to at least one embodiment performs the domain reasoning using a situation composed of several information combinations reflected in the domain reasoning process, current information, and a speech recognition result, and reduces the size of a dialogue search space simultaneously while increasing the accuracy of domain reasoning, the dialogue system can carry out a proper response and have a natural conversation with the user.

The dialogue system increases the accuracy of domain reasoning, and correctly recognizes the speech intention of the user, such that the dialogue system or a device incorporating the dialogue system, such as a robot, can carry out a certain service according to the intention of the user speech, resulting in increased user satisfaction.

The dialogue system receives environment information of a room in which the user stays, user schedule information, behavior history information of the user, indoor structure information of the user, and reflects the above information in the domain reasoning process, such that it can properly answer the user speech intention.

The at least one embodiment determines a current condition of the dialogue system, indicated by the determined situation, based on a variety of information, and determines a subject of a highly probable conversation on the basis of the current condition.

Although at least one embodiment has been shown and described, it would be appreciated by those skilled in the art that changes may be made in the at least one embodiment without departing from the principles and spirit of the invention, the scope of which is defined in the claims and their equivalents.

What is claimed is:

1. A dialogue system, comprising:
   a multimodal input unit receiving speech and non-speech information of a user;
   a domain reasoner, which stores a plurality of pre-stored situations, each of which is formed by a combination one or more speech and non-speech information, calculating an adaptability of each of the pre-stored situations based on a comparison with a situation generated based on the speech and the non-speech information received from the multimodal input unit, and determining a current domain according to the calculated adaptability of each of the pre-stored situations;
   a dialogue manager selecting a response corresponding to the current domain; and
   a multimodal output unit outputting the response,
   wherein the non-speech information comprises at least one of facial expression, dress, and gesture belonging to user status information as an input image.

2. The dialogue system according to claim 1, wherein the domain reasoner generates the situation by combining the speech and the non-speech information received from the multimodal input unit, compares the generated situation with the pre-stored situations, and calculates the adaptability of each of the pre-stored situations according to the result of comparison.

3. The dialogue system according to claim 2, wherein the domain reasoner receives a user response corresponding to the output response to determine a satisfaction degree of the user, reflects the satisfaction degree in the generated situation, updates the reflected result, and stores the updated result.

4. The dialogue system according to claim 1, wherein the pre-stored situations are generated by a learning operation and are stored.

5. The dialogue system according to claim 1, wherein each of the pre-stored situations is configured by combining preference-, habit-, and schedule-information of the user, at least one form of non-speech information from among facial expression, dress, and gesture belonging to user status information, and speech information of the user, and each of the pre-stored situations has a domain corresponding to the combination result.

6. The dialogue system according to claim 1, wherein the multimodal input unit receives at least one form of non-speech information from among facial expression, dress, and gesture belonging to user status information as an input image.

7. The dialogue system according to claim 1, wherein the domain reasoner selects one of the pre-stored situations having the highest adaptability.

8. The dialogue system according to claim 7, further comprising:
   a domain database (DB) unit storing a plurality of domains,
   wherein the domain reasoner calculates an adaptability of each domain using the selected situation, and determines a domain having a highest adaptability to be a current domain.

9. The dialogue system according to claim 1, wherein:
   the multimodal input unit detects environmental information of a room in which the user is currently located, and
   the domain reasoner determines the current domain using the environmental information.

10. The dialogue system according to claim 1, further comprising:
    an information provider providing schedule information of the user, behavior history information, indoor structure information, and weather information,
    wherein the domain reasoner determines the current domain using at least one of a schedule of the user, a behavior history, an indoor structure, and the weather information.

11. The dialogue system according to claim 1, wherein:
    the dialogue manager transmits dialogue context and previous dialogue information to the domain reasoner; and
    the domain reasoner determines the current domain using at least one of the dialogue context and previous dialogue information.

12. A dialogue system, comprising:
    a multimodal input unit receiving speech and non-speech information of a user;
    a domain reasoner, which stores a plurality of pre-stored situations, each of which is formed by a combination one or more speech and non-speech information, selecting a candidate domain corresponding to a speech signal received from the multimodal input unit, calculating an adaptability of each of the pre-stored situations based on a comparison of a situation generated based on the non-speech information received from the multimodal input unit, and determining a current domain based on one of the pre-stored situations having the highest adaptability in relation to the generated situation, and the candidate domain;

a dialogue manager selecting a response corresponding to the current domain; and a multimodal output unit outputting the selected response.

wherein the non-speech information comprises at least one of facial expression, dress, and gesture belonging to user status information as an input image.

13. The dialogue system according to claim 12, wherein each of the pre-stored situations includes a related domain.

14. A dialogue method for use in a dialogue system, the method comprising:

receiving speech information and non-speech information from a user;

calculating on a processor, an adaptability of each of pre-stored situations based on a comparison to a generated situation based on the received speech and non-speech information;

determining a current domain based on the calculated adaptability; and selecting a response corresponding to the determined current domain and outputting the selected response, wherein the non-speech information comprises at least one of facial expression, dress, and gesture belonging to user status information as an input image.

15. The dialogue method according to claim 14, wherein each of the pre-stored situations is configured by combining preference-, habit-, and schedule-information of the user, and at least one form of non-speech information from among facial expression, dress, and gesture belonging to user status information, and speech information of the user.

16. The dialogue method according to claim 14, wherein the determining of the current domain includes:

generating the situation by combining the received speech information and the received non-speech information;

calculating the adaptability by comparing the generated situation with each of the pre-stored situations; and selecting one of the pre-stored situations having the highest calculated adaptability.

17. The dialogue method according to claim 16, wherein the determining of the current domain further includes:

receiving a user response corresponding to the response output when the current domain is determined; and reflecting a satisfaction degree corresponding to the user response in the generated situation, and storing the reflected result.

18. The dialogue method according to claim 16, wherein the determining of the current domain further includes:

calculating an adaptability of each of pre-stored domains by applying the selected situation to each of the pre-stored domains; and determining a specific domain having a highest adaptability from among the pre-stored domains to be a current domain.

19. The dialogue method according to claim 18, wherein the determining of the specific domain having the highest adaptability to be a current domain includes:

comparing the adaptability of the specific domain having the highest adaptability with a reference value;

determining the specific domain to be the current domain when the adaptability is higher than the reference value; and determining an occurrence of a failure in current domain reasoning, and re-requesting a dialogue, when the adaptability is equal to or lower than the reference value.

20. The dialogue method according to claim 14, wherein the determining of the current domain includes:

receiving environment information of a room in which the user is currently located; and determining the current domain using the environmental information.

21. The dialogue method according to claim 14, wherein the determining of the current domain includes:

receiving schedule information of the user, behavior history information, indoor structure information, and weather information; and determining the current domain using at least one of schedule information of the user, behavior history information, indoor structure information, and the weather information.

22. The dialogue method according to claim 14, wherein the determining of the current domain includes:

receiving dialogue context and previous dialogue information as an input; and determining the current domain using at least one of the dialogue context and the previous dialogue information.

23. The dialogue method according to claim 14, wherein each of the pre-stored situations is configured by a combination of at least one form of non-speech information, and wherein a candidate domain is selected by recognizing the speech information, calculating an adaptability of each of the pre-stored situations based on the received non-speech information, selecting a specific situation having the highest adaptability from among the pre-stored situations, and determining a current domain based on the domain corresponding to the selected situation and the candidate domain.

* * * * *

UNITED STATES PATENT AND TRADEMARK OFFICE
CERTIFICATE OF CORRECTION

PATENT NO. : 8,719,015 B2  
APPLICATION NO. : 12/964866  
DATED : May 6, 2014  
INVENTOR(S) : Jun Won Jang et al.

Page 1 of 1

It is certified that error appears in the above-identified patent and that said Letters Patent is hereby corrected as shown below:

In the Claims

Column 17, Line 6, In Claim 12, delete "response." and insert -- response, --, therefor.

Column 17, Line 16, In Claim 14, after "calculating" insert -- , --, therefor.

Signed and Sealed this
Twenty-eighth Day of October, 2014

Michelle K. Lee
*Deputy Director of the United States Patent and Trademark Office*